Patented Oct. 25, 1932

1,884,774

UNITED STATES PATENT OFFICE

BORIS N. LOUGOVOY, OF NEW YORK, N. Y., ASSIGNOR TO CHADELOID CHEMICAL COMPANY, OF NEW YORK, N. Y., A CORPORATION OF WEST VIRGINIA

FINISH REMOVER CONTAINING CHLORINATED HYDROCARBON WAX SOLVENT

No Drawing.  Application filed December 27, 1928.  Serial No. 328,854.

The invention relates to a finish remover free or substantially free from benzol and hence non-benzolic, and particularly refers to a paint and varnish removing composition containing chlorinated hydrocarbons in admixture with loosening solvents, such as alcoholic, ketonic or esteric solvents, with a few per cent of waxy evaporation retarding material, the solvents being so balanced as to produce a composition with both a low rate of evaporation and a high cutting speed.

Some of the finish removing compositions on the market, considered as good are composed essentially of benzol as a wax solvent with acetone or acetone and alcohol as loosening solvents, these acting also as wax precipitants.

In making good paint removing compositions two essential conditions should be fulfilled, that is, the requirement of speed of action, i. e., the efficiency of the removing composition, and secondly, the requirement of low rate of evaporation, i. e., the property of a paint removing mixture to remain wet for a considerable time.

It is often very difficult to satisfy to a desired degree both fundamental requirements simultaneously, because of the necessity not only of the proper balance of the solvents in regard to their solvent power but also the necessity of the proper choice of physical constants of these solvents.

Oftentimes conditions necessary to fulfill one fundamental requirement, say, the proper rate of evaporation may at the same time be in contradiction with another basic requirement, that is, the proper activity of the removing mixture.

Benzol, while not a good solvent for dried coatings of paint or varnish when used alone, provides a good removing mixture when mixed with proper alcoholic or ketonic solvents and therefore has been considered as a desirable ingredient of paint and varnish removers. However, benzol has been questioned because of its possible injurious action on human health. Since paint and varnish removing compositions are used extensively on inside work, it is the object of my invention to substitute for the benzol some other material which will exhibit an activity at least equal to benzol in the removal of paint and varnish.

The use of benzol in paint and varnish removers serves a double purpose: Firstly, is a wax carrier or solvent. Secondly, it provides penetrating power. Wax is generally used to retard evaporation of the solvent mixture. Brought into suspension in a semi-colloidal state wax is capable of producing a surface-film which acts as a retarder of evaporation. In order to bring the wax to such a state it may, for example, be dissolved in some wax solvent and then precipitated from the solution with another finish solvent which is miscible with the wax solvent but which by itself is not a solvent for the wax. Alcohols, ketones, esters and many other organic solvents can be used for such purpose.

As a wax solvent many other substances can be used in place of benzol. They include hydrocarbons both of the aliphatic and aromatic series as well as substituted hydrocarbons, such as chlorinated hydrocarbons, both aromatic and aliphatic. While apparently there is the possibility of a considerable choice of various solvents to replace benzol, the question is not so simple when the practical requirements for a cheap but active remover having a desirably low evaporation rate, are taken into consideration. Many liquids, while being good wax solvents, such as petroleum hydrocarbons, do not assist, as does benzol, in providing satisfactory removing action. Contrary to benzol, when mixed with loosening solvents, they decrease (instead of increase) the efficiency. In addition, wax solvents of the nature of petroleum hydrocarbons oftentimes present another difficulty in paint and varnish remover; that is, the poor miscibility (especially in the presence of wax) with loosening solvents, such as alcohols or ketones.

The higher homologues of benzol, such as toluol or xylol, are also good solvents for wax and they also possess the penetrating properties of benzol to a considerable degree (but not to such a large degree as benzol), but, they have the disadvantage as compared with benzol of being less volatile and hence increasing the rate of evaporation of paint and varnish remover solvents, if used in conjunction with such low-boiling and volatile loosening solvents as acetone or methyl alcohol. Chlorinated hydrocarbons, such as trichlorethylene, acetylene tetrachloride, monochlorobenzol, dichlorobenzol, and the like, are also good wax solvents and by themselves have some removing action on paint.

However, certain chlorinated hydrocarbons, (especially aliphatic, saturated or unsaturated) as for example, carbon tetrachloride, are not very desirable as ingredients in paint and varnish removers because they are apt to develop free acidity. Chlorinated hydrocarbons, such as trichlorethylene or chlorobenzol, present the same difficulty as high boiling benzolic hydrocarbons (toluol, xylol), that is, being less readily volatile, they usually result in the increase of the rate of evaporation of the remover solvents.

Concerning this fundamental requirement for paint and varnish remover, that is, the proper depression of the rate of evaporation, it should be noted that the rate of evaporation of a paint and varnish removing mixture depends on several factors. First of all, for a given mixture of solvents the rate of evaporation, within certain limits, is (roughly) in inverse proportion to the amount of wax or other evaporation-retarding material introduced into the remover. That is to say, in increasing the wax, up to certain limits, decreases the volatility. In this connection it should be remembered that the proportion of such evaporation-retarding material is necessarily limited. As a rule any kind of solids, which are capable of dissolving in any of the solvents, when introduced into the removing mixture will produce a substantial decrease in efficiency of this solvent in respect to its own power on the dried finish coating (paint, varnish, etc.). Therefore the proportion of any such material is restricted by a certain practical limit. The rate of evaporation of removers which are to be used under extreme service conditions will be found practically satisfactory if the loss is not over about 5–6% of its weight in twenty-four hours when exposed in layer about 7 m.m. thick, in an open dish of about 2 inches in diameter to the action of the air at a temperature around 75° F., amount of sample being in the neighborhood of 20 grams.

While the wax or other evaporation-retarding material is an important fundamental ingredient of the paint and varnish removing composition, it is not the only one which when utilized produces a satisfactory result. For example, a mixture of solvents can be produced which will not have a good rate of evaporation even with a very large amount of wax, exceeding all permissible limits.

I have found that the rate of evaporation depends largely not only upon the actual boiling point (and/or vapor pressure at room temperature) of solvents used, but also to a very considerable degree upon the relation existing between the volatility of the wax solvents and the volatility of the wax precipitants contained therein. In order to obtain a slow-evaporating mixture, I propose to employ a mixture in which the wax solvents possess a somewhat higher volatility than the wax precipitants. This applies to all kinds of wax solvents, such as those above mentioned, and is particularly noticeable with hydrocarbon solvents, both of the aliphatic and aromatic groups. For example, taking a mixture of

|  | Parts |
|---|---|
| Hydrocarbon (See below) | 50 |
| Anhydrous methanol | 25 |
| Anhydrous acetone | 25 |
| Paraffin wax | 2 | the rate of evaporation in two hours will be as follows:

|  | Per cent |
|---|---|
| With benzol (boiling point 80° C.) as the hydrocarbon, loss in weight in two hours, about | 1 |
| With toluol (boiling point 111° C.) corresponding loss in weight in two hours | 20 |
| With xylol (boiling point 142° C.) corresponding loss in weight in two hours over | 37 |

With the same mixture of solvents except using petroleum hydrocarbons as wax solvents in lieu of benzol, toluol and xylol, the rate of evaporation was found to be as follows:

|  | Per cent |
|---|---|
| With petroleum ether (boiling point 40–60° C.) loss in weight in two hours, less than | 2 |
| With petroleum distillate (boiling range 60–85° C.) corresponding loss in weight | 45 |
| With petroleum distillate (boiling range 60–115° C.) corresponding loss in weight | 50 |

I have also observed that chlorinated hydrocarbons while following in general the above characterization have the advantage of a relatively smaller absolute drop in weight. Taking into consideration that certain chlorinated hydrocarbons, particularly trichlorethylene and chlorobenzol, are somewhat better paint solvents than benzol, they would present desirable materials as a substitute for benzol provided the rate of evaporation of a corresponding remover containing these hydrocarbons could be brought within a satisfactory limit. The above-mentioned rate of evaporation for various solvents is graphically illustrated in diagrams Nos. 1, 2 and 3.

I have also found that the requirements for a wax precipitant having lower volatility than the volatility of a given wax solvent need not be fulfilled for all the wax precipitants entering into the removing compositions. It is sufficient that a substantial proportion of such solvents be present among the wax precipitant solvents. For example: when toluol, which has a boiling point of 110–111° C., is used, it is possible to use such a low boiling solvent, such as acetone, provided the acetone is used in conjunction with some other solvent of a higher boiling point, such as lugosol (the product obtained from acetone by treatment with a small amount of alkali, having a boiling range from 60 to 170° C.), methyl ethyl ketone, furfural, benzyl alcohol and the like.

In working on the present problem with the purpose in view of producing a non-benzolic remover containing chlorinated hydrocarbons which should satisfy both fundamental requirements; that is, which will have a good efficiency and a low rate of evaporation, the following methods were used to determine these factors.

To determine the rate of evaporation a portion of each remover was placed into a shallow dish of about 2 inches in diameter. Approximately equal proportions (about 20 grams) of each sample were taken. All dishes were placed in a ventilated box where an even temperature of about 75° F. was maintained. Each sample was weighed at regular intervals to determine the loss by evaporation.

To determine the removing power or cutting efficiency of the mixture, two methods have been used. One method was applied to pure solvents or to their mixtures, which did not contain wax, and consisted in placing each solvent in a test tube, immersing in that solvent a strip of painted wood and noting the time by means of a stop watch when the wrinkling or blistering of the paint appeared. Another method which was used for the completed paint and varnish removers, (i. e., the above solvents with wax) was as follows: A panel from an automobile was chosen as the testing surface. Approximately equal proportions of each remover were placed on this panel and the time was noted by means of a stop watch for the appearance of about the same degree of wrinkling.

The table below contains the figures obtained by the first method, i. e., by measuring with immersed painted wood for various single solvents and their intermixtures. The cutting power is expressed in seconds.

*Paint and varnish remover solvents containing chlorinated hydrocarbons*

| | Cutting power seconds |
|---|---|
| Benzol | 3600 |
| Monochlorobenzol | 400 |
| Petroleum naphtha | No action |
| Trichlorethylene | 360 |
| Anhydrous methanol | 240 |
| Acetone | 80 |
| Lugosol | 45 |
| Methyl ethyl ketone | 75 |
| Methyl cellosolve | 90 |
| (Methyl cellosolve is methyl ether of ethylene glycol) mixtures (equal parts by volume). | |
| Benzol and anhydrous methanol | 45 |
| Trichlorethylene and methanol | 30 |
| Monochlorobenzol and methanol | 15 |
| Petroleum naphtha and methanol | 260 |
| Benzol and acetone | 65 |
| Trichlorethylene and acetone | 35 |
| Monochlorobenzol and acetone | 35 |
| Petroleum naphtha and acetone | 280 |
| Benzol and methyl cellosolve | 70 |
| Trichlorethylene and methyl cellosolve | 40 |
| Monochlorobenzol and methyl cellosolve | 35 |
| Benzol, acetone and methanol | 50 |
| Trichlorethylene, acetone and methanol | 25 |
| Monochlorobenzol, acetone and methanol | 15 |
| Petroleum naphtha, acetone and methanol | 155 |

Below are given various examples of paint and varnish removing compositions made in accordance with the present invention giving in each case information relating to rate of evaporation and the removing power of each composition. In giving these examples I will not only illustrate the practical application of the present specification but will also illustrate the influence of the improper choice of boiling point of solvents in reference to the rate of evaporation.

It is understood that the proportions given in these examples should be regarded only as illustrations and that I do not wish to restrict myself to these proportions, since they may be modified, if necessary, according to the requirements of those skilled in the art. All proportions are given by volume, including wax, which was measured in molten state. Removing power was determined on a panel from an automobile as described above (Method 2).

Example 1

| | Parts | Boiling point |
|---|---|---|
| Trichlorethylene | 40 | 87° C. |
| Lugosol | 30 | 60–170° C. |
| Methyl acetate | 20 | 54° C. |
| Paraffin wax | 2 | |
| Loss in weight in two hours | | None |
| Loss in weight in twenty-four hours | | 2.2% |
| Removing power | | 115 seconds. |

Example 2

| | Parts | Boiling point |
|---|---|---|
| Trichlorethylene | 40 | 87° C. |
| Anhydrous methanol | 25 | 64° C. |
| Lugosol | 15 | 60–170° C. |
| Methyl acetate | 15 | 54° C. |
| Paraffin wax | 2 | |
| Loss in weight in two hours | | 1.5% |
| Loss in weight in twenty-four hours | | 6.5% |
| Removing power | | 80 seconds. |

Example 3 (improper balance)

| | Parts | Boiling point |
|---|---|---|
| Trichlorethylene | 50 | 87° C. |
| Anhydrous methanol | 25 | 64° C. |
| Methyl acetate | 25 | 54° C. |
| Paraffin wax | 2 | |
| Loss in weight in two hours | | 5.0% |
| Loss in weight in twenty-four hours | | 15.0% |
| Removing power | | 72 seconds. |

Example 4

| | Parts | Boiling point |
|---|---|---|
| Trichlorethylene | 50 | 87° C. |
| Methyl cellosolve | 50 | About 125° C. |
| Paraffin wax | 2 | |
| Loss in weight in twenty-four hours | | 2.7% |
| Removing power | | 125 seconds. |

Example 5 (improper balance)

| | Parts | Boiling point |
|---|---|---|
| Trichlorethylene | 40 | 87° C. |
| Acetone | 30 | 56° C. |
| Methyl acetate | 20 | 54° C. |
| Paraffin wax | 2 | |
| Loss in weight in two hours | | 22.0% |
| Loss in weight in twenty-four hours | | 64.0% |
| Removing power | | 90 seconds. |

Example 6

| | Parts | Boiling point |
|---|---|---|
| Monochlorobenzol | 50 | 132° C. |
| Anhydrous methanol | 25 | 64° C. |
| Lugosol | 25 | 60–170° C. |
| Paraffin wax | 3 | |
| Loss in weight in two hours | | 1.0% |
| Loss in weight in twenty-four hours | | 2.9% |
| Removing power | | 120 seconds. |

Example 7 (improper balance)

| | Parts | Boiling point |
|---|---|---|
| Monochlorobenzol | 50 | 132° C. |
| Anhydrous methanol | 25 | 64° C. |
| Acetone | 25 | 56° C. |
| Paraffin wax | 3 | |
| Loss in weight in two hours | | 26.5% |
| Loss in weight in twenty-four hours | | 51.0% |
| Removing power | | 125 seconds. |

Example 8

| | Parts | Boiling point |
|---|---|---|
| Monochlorobenzol | 50 | 132° C. |
| Methyl cellosolve | 50 | 125° C. |
| Paraffin wax | 2 | |
| Loss in weight in twenty-four hours | | 1.3% |
| Removing power | | 150 seconds. |

"Lugosol" referred to herein is a composite material readily prepared by adding a small amount, say 0.02 or 0.03% of caustic soda, caustic potash, lime, baryta or strontia, to a bulk of neutral acetone, allowing the mixture to stand for at least 16 hours, carefully neutralizing the alkali, and fractionally distilling, collecting separately a fraction distilling between about 60 and 170° C. This latter fraction, I term "lugosol" and the term is so used throughout this case.

*Note:*

A benzol remover of very high grade, containing benzol, acetone and anhydrous methanol, with paraffin wax, showed a loss in weight in twenty-four hours, of about 2%, and a removing power of 145 seconds. The said remover here described, is about the best of the removers of this type.

I claim:—

A non-benzolic finish remover of activity at least as great as high grade commercial benzol remover, containing a mineral wax in amount equal to not over 2% of the entire remover, chlorinated hydrocarbons less volatile than benzol, as the wax solvent and containing wax precipitant loosening solvent including liquids of the group consisting of "lugosol", methyl acetate, methanol, "methyl cellosolve", acetone, methyl-ethyl ketone and in which the entire wax precipitant is at least as slowly volatile, at room temperature, as is the chlorinated hydrocarbon, the amount of the loosening solvent in said remover being at least as great as the amount of said wax solvent, and said remover being capable of retaining over 90% of its solvents over a period of twenty-four hours when exposed to the air at a temperature around 75° F., in a layer of about 7 m.m. thick.

In testimony whereof I affix my signature.

BORIS N. LOUGOVOY.